(No Model.)   3 Sheets—Sheet 1.
M. P. HAYES.
EVAPORATING APPARATUS FOR BRINE, &c.
No. 321,025. Patented June 30, 1885.
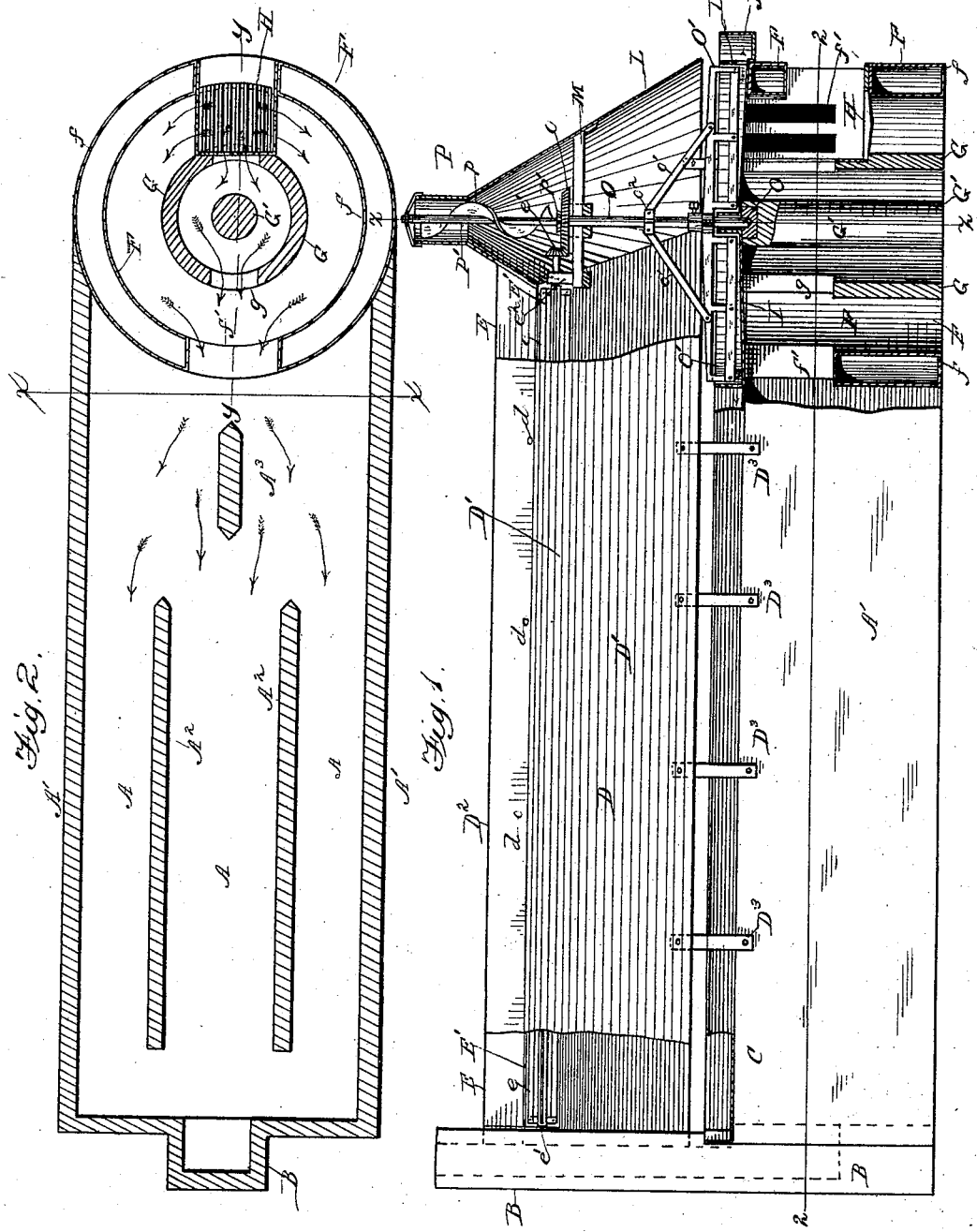

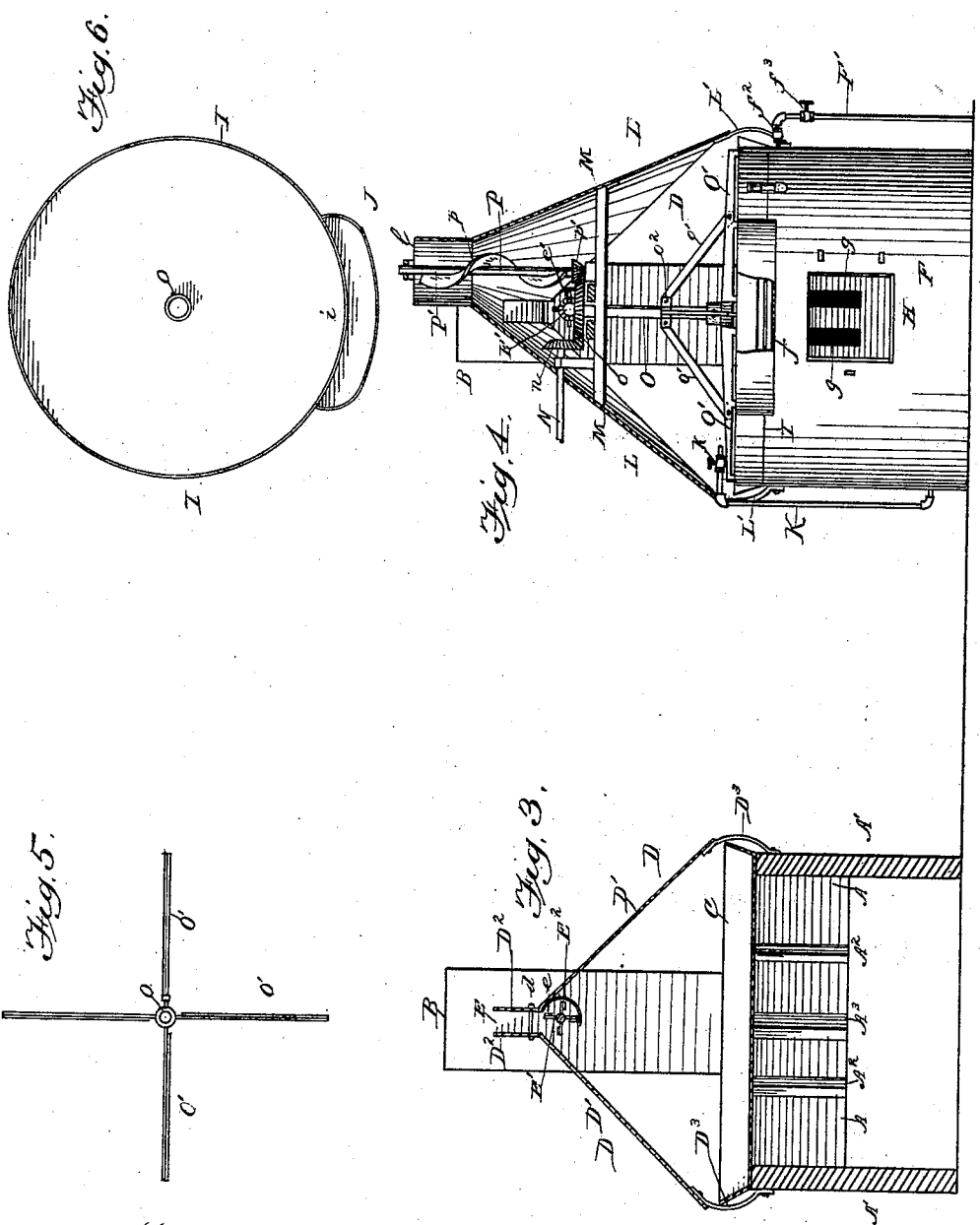

(No Model.)

3 Sheets—Sheet 3.

M. P. HAYES.
EVAPORATING APPARATUS FOR BRINE, &c.

No. 321,025. Patented June 30, 1885.

Attest:
H. J. Perichard
A. L. Heaton

Inventor:
M. P. Hayes
By his attorneys
Eden Bros.

N. PETERS, Photo-Lithographer, Washington, D. C.

UNITED STATES PATENT OFFICE.

MARTIN P. HAYES, OF CHICAGO, ILLINOIS, ASSIGNOR OF ONE HALF TO JOSEPH M. DUNCAN, OF WARSAW, NEW YORK.

EVAPORATING APPARATUS FOR BRINE, &c.

SPECIFICATION forming part of Letters Patent No. 321,025, dated June 30, 1885.

Application filed January 28, 1885. (No model.)

*To all whom it may concern:*

Be it known that I, MARTIN P. HAYES, a subject of the Queen of Great Britain, residing at Chicago, in the county of Cook and State of Illinois, have invented certain new and useful Improvements in Evaporating Apparatus; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to an improved apparatus for the evaporation of brine; and it consists in the construction, combination, and arrangement of the various parts for service, substantially as hereinafter fully set forth, and pointed out in the claims.

The invention has for its object to produce a finer and purer grade of salt than it has been heretofore possible to produce, while at the same time the evaporation of the brine is more quickly accomplished, and a saving in time and fuel secured, all as hereinafter pointed out.

The invention is fully illustrated in the accompanying drawings, which form a part of this specification, and in which—

Figure 7:
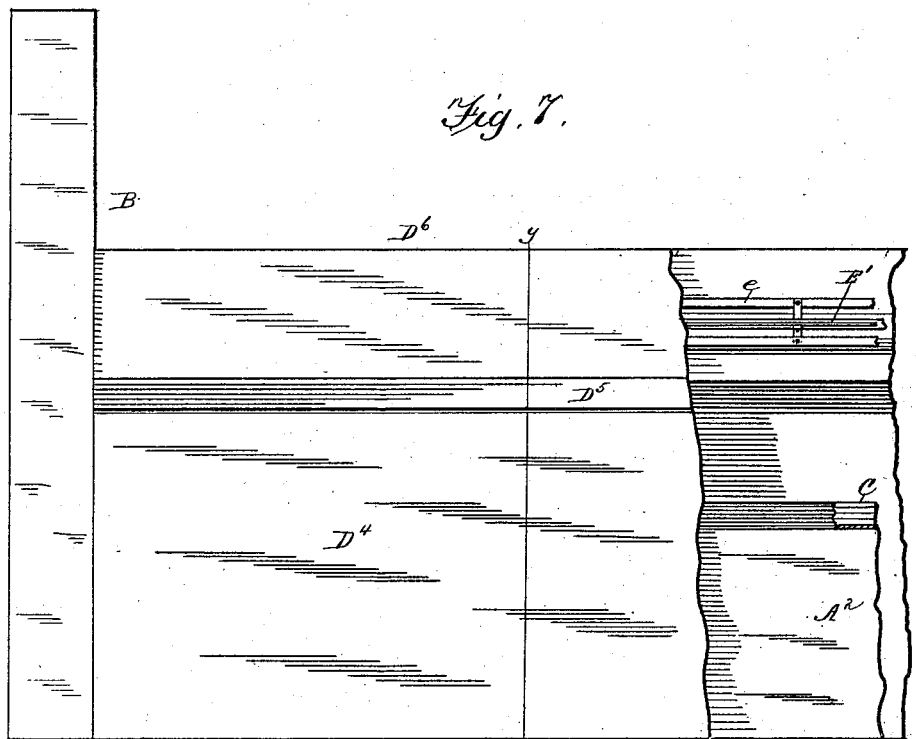
Figure 8:
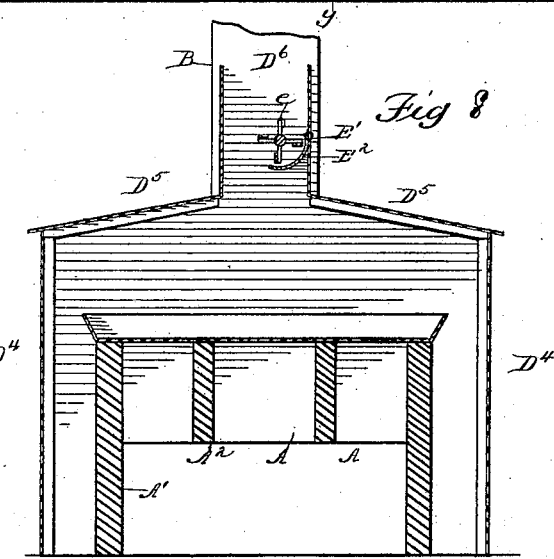

Figure 1 is a view of my improved apparatus, partly in section and partly in side elevation. Fig. 2 is a horizontal longitudinal section on the line 2 2 of Fig. 1. Fig. 3 is a cross-section on the line $x$ $x$ of Fig. 2. Fig. 4 is a similar sectional view on the line $z$ $z$ of Fig. 1. Figs. 5 and 6 are detail views of parts of my improvements. Fig. 7 is a side elevation, partly broken away, of an ordinary salt apparatus or "block," and Fig. 8 is a cross-section thereof on the line $y$ $y$ of Fig. 7.

Like letters of reference denote like parts in all the figures of the drawings.

Referring to the drawings, A A designate the flues, formed by the outside inclosing-walls, A' A', spaced apart, as shown in Fig. 2; and B, the smoke-stack. A deflecting-wall, $A^3$, is arranged in front of and between the said walls $A^2$, to direct the products of combustion into said flues. I do not limit myself to the particular arrangement of flues just described, but hold myself at liberty to employ any arrangement and construction of flues wherein the products of combustion can be utilized in heating the back pan, hereinafter described, on their passage to the smoke-stack.

C designates the back pan, supported upon the inclosing and bridge walls, A' $A^2$, over which is placed a roof, D, of very light but firm and strong construction, said roof being preferably made of light boards or sheet metal. The roof is made in two longitudinal sections, each of which consists of sloping walls D', provided with bent vertical portion $D^2$, supported at its lower end by straps or posts $D^3$, secured thereto and to the walls A' of the flues. The upper ends of the roof-sections are brought close together and bolted, as at $d$, thus providing a flume or exit, E, for the steam arising from the brine during the evaporation thereof.

In Figs. 7 and 8 of the drawings I illustrate a form of shed or inclosure in common use in this class of devices, consisting of side walls, $D^4$, built up from the ground, and a roof, $D^5$, having an exit or flume, $D^6$, arranged at about its middle.

E' designates a fan-shaft supported at its ends, as at $e'$ $e^2$, and at intervals (not shown) throughout its length, and having blades $e$ secured thereon. Said fan is preferably arranged immediately below the flume E, as shown in Figs. 1 and 3, and revolves in a casing, $E^2$, semicircular in cross-section, and secured at its upper end to the sloping wall of one of the roof-sections. I do not, however, limit myself to locating the fan below the flume, as it may be placed within the flume, as shown in Figs. 7 and 8, or located above the same, as is obvious, without departing from the principle of my invention, one of the essential features of which consists in locating a fan in close proximity to a flume formed in the roof of a shed or inclosure of a salt apparatus or block, said fan being adapted to revolve and draw off or exhaust the steam arising from the brine during the evaporation thereof.

F designates a receptacle or heater located at the front of the flues, of cylindrical form, and having hollow walls $f$, provided with openings $f'$, in which the brine from any suitable tank or supply is admitted, under pressure, through a pipe, F', having check and globe valves $f^2 f^3$, respectively. Within the receptacle or heater F is built a circular wall, G, and a pillar, G', said wall having exits or openings $g$, for the passage of the products of combustion from the furnace H, arranged in front of the heater and supported within the walls thereof and the wall G, as clearly shown in Figs. 1 and 2.

I designates a pan circular in form, located upon and supported by the walls of the heater F, and having its bottom made downwardly sloping from the center toward its edges, (see Fig. 1,) and at one side provided with an aperture, $i$, opening into a chamber or pocket, J, secured to said pan, and having its bottom on a plane below the bottom of the pan, for a purpose hereinafter described.

K designates a pipe arranged on the side of the heater F, having its lower end in communication with the chamber contained between its hollow walls, while the upper end of the pipe is bent so as to project over the pan I, and provided with a cock or valve, $k$, whereby the brine, after being heated to nearly the boiling-point, is permitted to pass to the pan I, and thence to the pan C, through an opening in the side wall of the said pan I; or a separate pipe may be provided for the pan C to pass the brine from the heater thereto.

L designates a roof, located over the pan I, made conical in form, and provided with an exit, $l$, at its top for the steam from the brine, said roof being supported at its lower end by straps or posts L', secured thereto and to the walls of the heater F.

M designates a frame secured to the inner surface of the roof L. In suitable bearings in said frame M is supported a horizontal shaft, N, driven by power from any suitable source or motor, and having a pinion, $n$, gearing with a larger pinion or gear-wheel, $o$, secured on a vertical shaft, O, supported at its upper end in said frame, and having the lower end thereof passed through the pan I, and bearing in the pillar G'. (See Fig. 1.) The shaft O is provided at its lower end with a series of scraper-blades, O', secured to a collar thereon and braced by rods $o'$, pivoted to said blades and to a sleeve fitted on said shaft. These scraper-blades are caused to revolve by the motion of the shaft, and thus force the salt towards the outer edges of the pan and into the pocket J, from whence it can be readily removed.

A fan, P, located within the roof L, consisting, preferably, of a vertical shaft, P', having a spiral blade, $p$, and a pinion, $p'$, gearing with the pinion $o$, is adapted to exhaust the steam arising from the brine in the pan I during its evaporation.

It will be observed that the fan-shaft E' is provided at one end with a pinion, $e'$, which is adapted to mesh with the gear-wheel $o$, and thus revolve the said fan, and cause the rapid exhaustion of the steam arising from the brine during evaporation thereof.

The operation of my invention is as follows: The brine from a tank or other elevated source is forced into the receptacle F, thence through suitable pipes onto the surface of the pans. In the receptacle F the brine is heated to a temperature of about 150° Fahrenheit, and at this temperature the sulphates of lime and deliquescent chlorides of calcium and magnesium which are contained in the brine are deposited on the bottom of the heater, it being one of the characteristics of these impurities that they are less soluble in hot water than cold water. The brine, being thus heated and purified, passes on to the pans.

The front pan is specially adapted for making fine table or dairy salt. The rapid evaporation caused by the fan, and quick regular removal of the salt by the revolving scrapers, produce a very fine even-grained salt, suitable for table and dairy purposes without grinding.

The back pan utilizes the heat remaining in the products of combustion by making ordinary coarse salt.

It will be observed that the heat from the furnace passes around the spaces between the heater and wall G, and also through the apertures in said wall, thus thoroughly and evenly heating the pan I and simultaneously raising the temperature of the brine in the heater or receptacle F, after which the heat passes to the flues, where it is utilized on its passage to the smoke-stack to heat the back pan, C. The steam arising from the evaporation of the brine in the front pan, I, is drawn off or exhausted by the fan P.

It will be seen from the foregoing description that the temperature of the brine is brought to nearly the boiling-point in the heater F before passing to the evaporating-pans, thus effecting a saving of time, and that when passed to the pans the evaporation thereof is thereby facilitated, and the steam arising therefrom during such evaporation is rapidly carried off by the fans. In the apparatus hereinbefore described the crystallization of the salt is rapidly and economically effected, and the purity and grade of the product is improved.

I am aware that various modifications in the details of construction and form and proportion of parts herein shown and described as an embodiment of my invention can be made without departing from the principle or sacrificing the advantages thereof—as, for instance, other means than that shown for supporting the roof and for driving the fans can be employed. Also, the roof D can be divided into chambers by transverse partitions, and each chamber provided with a separate fan and exit; or the fan may run the entire length of the roof, and be located below, within, or in the upper portion of the flume thereof, as described. I would therefore have it understood that I hold myself at liberty to make such changes and alterations as fairly fall within the principle or scope of my invention.

Having thus fully described my invention, what I claim, and desire to secure by Letters Patent of the United States, is—

1. In an evaporating apparatus, the combination of a circular heating-receptacle, a pan with an outwardly and downwardly sloping bottom, located on said receptacle, and a revolving shaft carrying scraper-blades, substantially as described.

2. In an apparatus for evaporation of brine, the combination of a circular heating-receptacle having supply and exit pipes, a pan supported on said receptacle, a roof located over said pan, and an exhausting-fan located below or over the roof-opening, substantially as described, and for the purpose set forth.

3. In an evaporating apparatus, the combination of a circular heating-receptacle, a pan having a sloping bottom, a shaft carrying scraper-blades, and an exhausting-fan located on a plane above said pan, substantially as described.

4. In an evaporating apparatus, the combination of a circular heating-receptacle having a furnace and supply and exit pipes, a pan, a revolving shaft carrying scraper-blades adapted to force the salt outwardly into a pocket or receptacle of the pan, a roof located over the pan, having an exit in its top, and a fan adapted to carry off the steam arising during the evaporation of the brine, substantially as and for the purpose set forth.

5. The combination of the heating-receptacle having a furnace and supply and exit pipes, walls G, having openings, pan I, having an inclined bottom and a pocket, a revolving shaft, O, carrying scraper-blades, a roof conical in form, having an exit at its top and located over the pan I, and a fan, P, located below the roof-opening, substantially as described.

6. In an evaporating apparatus, the combination of the pans C I, heating-receptacle F, furnace H, located within said receptacle, flues A, roofs D L, located over said pans, and each provided with an opening, and exhausting-fans, substantially as described, and for the purpose set forth.

7. The combination of a circular heating-receptacle, F, having supply and exit pipes F' K, furnace H, wall G, having openings, front pan, I, having a pocket, and located over the heater, pan C, roofs D L, fans E P, shaft O, carrying scraper-blades, and means for revolving said fans and shaft, substantially as described.

8. In an evaporating apparatus, the combination of a pan, a roof located over said pan, and having a flume, and a fan arranged in close proximity to such flume, and adapted to be revolved by any suitable motor, whereby the steam arising from the pan is exhausted, substantially as described.

9. In an evaporating apparatus, the combination of flues A, pan C, roof D, made in two longitudinal sections supported at their lower ends, and a fan and casing located in close proximity to the flume or exit of the roof, substantially as described.

In testimony whereof I affix my signature in presence of two witnesses.

MARTIN P. HAYES.

Witnesses:
DUNCAN S. GOODING,
GEORGE F. WESTOVER.